(12) United States Patent
Munoz, Jr. et al.

(10) Patent No.: US 7,678,743 B2
(45) Date of Patent: *Mar. 16, 2010

(54) DRILL-IN FLUIDS AND ASSOCIATED METHODS

(75) Inventors: Trinidad Munoz, Jr., Duncan, OK (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 352 days.

This patent is subject to a terminal disclaimer.

(21) Appl. No.: 11/524,828

(22) Filed: Sep. 20, 2006

(65) Prior Publication Data

US 2008/0070808 A1   Mar. 20, 2008

(51) Int. Cl.
*C08B 37/00* (2006.01)
(52) U.S. Cl. .................................. 507/110; 175/72
(58) Field of Classification Search ................ 507/110; 175/72
See application file for complete search history.

(56) References Cited

U.S. PATENT DOCUMENTS

| | | |
|---|---|---|
| 2,239,671 A | 4/1941 | Woodhouse |
| 2,703,316 A | 3/1955 | Palmer |
| 2,863,832 A | 12/1958 | Perrine |
| 2,910,436 A | 10/1959 | Fatt et al. |
| 3,015,680 A | 1/1962 | Isler et al. |
| 3,173,484 A | 3/1965 | Huitt et al. |
| 3,195,635 A | 7/1965 | Fast |
| 3,215,199 A | 11/1965 | Dilgren |
| 3,251,415 A | 5/1966 | Bombardieri et al. |
| 3,272,650 A | 9/1966 | Mac Vittie |
| 3,297,090 A | 1/1967 | Dilgren |
| 3,302,719 A | 2/1967 | Fischer |
| 3,307,630 A | 3/1967 | Dilgren et al. |
| 3,364,995 A | 1/1968 | Atkins et al. |
| 3,366,178 A | 1/1968 | Malone et al. |
| 3,382,924 A | 5/1968 | Veley et al. |
| 3,434,971 A | 3/1969 | Atkins |
| 3,441,085 A | 4/1969 | Gidley |
| 3,451,818 A | 6/1969 | Wareham |
| 3,455,390 A | 7/1969 | Gallus |
| 3,658,832 A | 4/1972 | Asato et al. |
| 3,744,566 A | 7/1973 | Szabo et al. |
| 3,784,585 A | 1/1974 | Schmitt et al. |
| 3,819,525 A | 6/1974 | Hatterbrun |
| 3,828,854 A | 8/1974 | Templeton et al. |
| 3,868,998 A | 3/1975 | Lybarger et al. |
| 3,910,862 A | 10/1975 | Barabas et al. |
| 3,912,692 A | 10/1975 | Casey et al. |
| 3,948,672 A | 4/1976 | Harnsberger |
| 3,955,993 A | 5/1976 | Curtice et al. |
| 3,960,736 A | 6/1976 | Free et al. |
| 3,968,840 A | 7/1976 | Tate |
| 3,998,272 A | 12/1976 | Maly |
| 3,998,744 A | 12/1976 | Arnold et al. |
| 4,068,718 A | 1/1978 | Cooke, Jr. et al. |
| 4,129,183 A | 12/1978 | Kalfoglou |
| 4,142,595 A | 3/1979 | Anderson et al. |
| 4,152,274 A | 5/1979 | Phillips et al. |
| 4,158,521 A | 6/1979 | Anderson et al. |
| 4,158,726 A | 6/1979 | Kamada et al. |
| 4,169,798 A | 10/1979 | DeMartino |
| 4,172,066 A | 10/1979 | Zweigle et al. |
| 4,261,421 A | 4/1981 | Watanabe |
| 4,299,710 A | 11/1981 | Dupre et al. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,387,769 A | 6/1983 | Erbstoesser et al. |
| 4,393,939 A | 7/1983 | Smith et al. |
| 4,395,340 A | 7/1983 | McLaughlin |
| 4,401,789 A | 8/1983 | Gideon |
| 4,439,334 A | 3/1984 | Borchardt |
| 4,440,649 A | 4/1984 | Loftin et al. |
| 4,447,342 A | 5/1984 | Borchardt et al. |
| 4,460,052 A | 7/1984 | Gockel |
| 4,460,627 A | 7/1984 | Weaver et al. |
| 4,462,718 A | 7/1984 | McLaughlin et al. |

(Continued)

FOREIGN PATENT DOCUMENTS

DE    2 250 552    4/1974

(Continued)

OTHER PUBLICATIONS

Botermans, C. Wouter, et al, Relative Permeability Modifiers: Myth or Reality?, SPE Paper No. 68973, 2001, Society of Petroleum Engineers, Inc.

(Continued)

*Primary Examiner*—Timothy J. Kugel
*Assistant Examiner*—Atnaf Admasu
(74) *Attorney, Agent, or Firm*—Craig W. Roddy; Baker Botts, LLP (57) ABSTRACT

Of the many compositions provided herein, in one embodiment, the present invention provides a drill-in fluid comprising an aqueous base fluid, a viscosifier, a relative permeability modifier fluid loss control additive, and a degradable bridging agent comprising a degradable material capable of undergoing an irreversible degradation downhole.

21 Claims, 1 Drawing Sheet

U.S. PATENT DOCUMENTS

| | | |
|---|---|---|
| 4,470,915 A | 9/1984 | Conway |
| 4,498,995 A | 2/1985 | Gockel |
| 4,526,695 A | 7/1985 | Erbstoesser et al. |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,552,670 A | 11/1985 | Lipowski et al. |
| 4,554,081 A | 11/1985 | Borchardt et al. |
| 4,563,292 A | 1/1986 | Borchardt |
| 4,604,216 A | 8/1986 | Irvin et al. |
| 4,627,926 A | 12/1986 | Peiffer et al. |
| 4,671,883 A | 6/1987 | Connell et al. |
| 4,693,639 A | 9/1987 | Hollenbeak et al. |
| 4,694,905 A | 9/1987 | Armbruster |
| 4,699,722 A | 10/1987 | Dymond et al. |
| 4,715,967 A | 12/1987 | Bellis et al. |
| 4,716,964 A | 1/1988 | Erbstoesser et al. |
| 4,730,028 A | 3/1988 | Bock et al. |
| 4,785,884 A | 11/1988 | Armbruster |
| 4,797,262 A | 1/1989 | Dewitz |
| 4,809,783 A | 3/1989 | Hollenbeck et al. |
| 4,817,721 A | 4/1989 | Pober |
| 4,828,726 A | 5/1989 | Himes et al. |
| 4,843,118 A | 6/1989 | Lai et al. |
| 4,848,467 A | 7/1989 | Cantu et al. |
| 4,886,354 A | 12/1989 | Welch et al. |
| 4,957,165 A | 9/1990 | Cantu et al. |
| 4,959,432 A | 9/1990 | Fan et al. |
| 4,961,466 A | 10/1990 | Himes et al. |
| 4,986,353 A | 1/1991 | Clark et al. |
| 4,986,354 A | 1/1991 | Cantu et al. |
| 4,986,355 A | 1/1991 | Casad et al. |
| 5,071,934 A | 12/1991 | Peiffer |
| 5,082,056 A | 1/1992 | Tackett, Jr. |
| 5,097,904 A | 3/1992 | Himes |
| 5,142,023 A | 8/1992 | Gruber et al. |
| 5,146,986 A | 9/1992 | Dalrymple |
| 5,160,642 A | 11/1992 | Schield et al. |
| 5,197,544 A | 3/1993 | Himes |
| 5,208,216 A | 5/1993 | Williamson et al. |
| 5,211,234 A | 5/1993 | Floyd |
| 5,216,050 A | 6/1993 | Sinclair |
| 5,244,042 A | 9/1993 | Dovan et al. |
| 5,247,059 A | 9/1993 | Gruber et al. |
| 5,249,628 A | 10/1993 | Surjaatmadja |
| 5,271,466 A | 12/1993 | Harms |
| 5,295,542 A | 3/1994 | Cole et al. |
| 5,325,923 A | 7/1994 | Surjaatmadja et al. |
| 5,330,005 A | 7/1994 | Card et al. |
| 5,342,530 A | 8/1994 | Aften et al. |
| 5,359,026 A | 10/1994 | Gruber |
| 5,360,068 A | 11/1994 | Sprunt et al. |
| 5,363,916 A | 11/1994 | Himes et al. |
| 5,373,901 A | 12/1994 | Norman et al. |
| 5,379,841 A | 1/1995 | Pusch et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,439,055 A | 8/1995 | Card et al. |
| 5,460,226 A | 10/1995 | Lawson et al. |
| 5,464,060 A | 11/1995 | Hale et al. |
| 5,475,080 A | 12/1995 | Gruber et al. |
| 5,484,881 A | 1/1996 | Gruber et al. |
| 5,497,830 A | 3/1996 | Boles et al. |
| 5,499,678 A | 3/1996 | Surjaatmadja et al. |
| 5,504,235 A | 4/1996 | Hirose et al. |
| 5,505,787 A | 4/1996 | Yamaguchi |
| 5,512,071 A | 4/1996 | Yam et al. |
| 5,536,807 A | 7/1996 | Gruber et al. |
| 5,591,700 A | 1/1997 | Harris et al. |
| 5,594,095 A | 1/1997 | Gruber et al. |
| 5,597,783 A | 1/1997 | Audibert et al. |
| 5,604,186 A | 2/1997 | Hunt et al. |
| 5,607,902 A | 3/1997 | Smith et al. |
| 5,607,905 A | 3/1997 | Dobson, Jr. et al. |
| 5,637,556 A | 6/1997 | Argillier et al. |
| 5,646,093 A | 7/1997 | Dino |
| 5,669,456 A | 9/1997 | Audibert et al. |
| 5,670,473 A | 9/1997 | Scepanski |
| 5,698,322 A | 12/1997 | Tsai et al. |
| 5,720,347 A | 2/1998 | Audibert et al. |
| 5,728,653 A | 3/1998 | Audibert et al. |
| 5,735,349 A | 4/1998 | Dawson et al. |
| 5,765,642 A | 6/1998 | Surjaatmadja |
| 5,791,415 A | 8/1998 | Nguyen et al. |
| 5,833,000 A | 11/1998 | Weaver et al. |
| 5,849,401 A | 12/1998 | El-Afandi et al. |
| 5,853,048 A | 12/1998 | Weaver et al. |
| 5,887,653 A | 3/1999 | Bishop et al. |
| 5,893,416 A | 4/1999 | Read |
| 5,908,073 A | 6/1999 | Nguyen et al. |
| 5,909,774 A | 6/1999 | Griffith et al. |
| 5,924,488 A | 7/1999 | Nguyen et al. |
| 5,944,106 A | 8/1999 | Dalrymple et al. |
| 5,964,291 A | 10/1999 | Bourne et al. |
| 5,972,848 A | 10/1999 | Audibert et al. |
| 5,979,557 A | 11/1999 | Card et al. |
| 6,004,400 A | 12/1999 | Bishop et al. |
| 6,020,289 A | 2/2000 | Dymond |
| 6,024,170 A | 2/2000 | McCabe et al. |
| 6,028,113 A | 2/2000 | Scepanski |
| 6,047,772 A | 4/2000 | Weaver et al. |
| 6,070,664 A | 6/2000 | Dalrymple et al. |
| 6,114,410 A | 9/2000 | Betzold |
| 6,123,965 A | 9/2000 | Jacob et al. |
| 6,124,245 A | 9/2000 | Patel |
| 6,131,661 A | 10/2000 | Conner et al. |
| 6,135,987 A | 10/2000 | Tsai et al. |
| 6,143,698 A | 11/2000 | Murphey et al. |
| 6,162,766 A | 12/2000 | Muir et al. |
| 6,169,058 B1 | 1/2001 | Le et al. |
| 6,172,011 B1 | 1/2001 | Card et al. |
| 6,187,839 B1 | 2/2001 | Eoff et al. |
| 6,189,615 B1 | 2/2001 | Sydansk |
| 6,202,751 B1 | 3/2001 | Chatterji et al. |
| 6,209,643 B1 | 4/2001 | Nguyen et al. |
| 6,209,646 B1 | 4/2001 | Reddy et al. |
| 6,214,773 B1 | 4/2001 | Harris et al. |
| 6,228,812 B1 | 5/2001 | Dawson et al. |
| 6,237,687 B1 | 5/2001 | Barbee, Jr. et al. |
| 6,242,390 B1 | 6/2001 | Mitchell et al. |
| 6,253,851 B1 | 7/2001 | Schroeder, Jr. et al. |
| 6,260,622 B1 | 7/2001 | Blok et al. |
| 6,277,900 B1 | 8/2001 | Oswald et al. |
| 6,283,210 B1 | 9/2001 | Soliman et al. |
| 6,291,013 B1 | 9/2001 | Gibson et al. |
| 6,311,773 B1 | 11/2001 | Todd et al. |
| 6,323,307 B1 | 11/2001 | Bigg et al. |
| 6,326,458 B1 | 12/2001 | Gruber et al. |
| 6,328,105 B1 | 12/2001 | Betzold |
| 6,357,527 B1 | 3/2002 | Norman et al. |
| 6,359,047 B1 | 3/2002 | Thieu et al. |
| 6,364,016 B1 | 4/2002 | Dalrymple et al. |
| 6,364,945 B1 | 4/2002 | Chatterji et al. |
| 6,380,137 B1 | 4/2002 | Heier et al. |
| 6,380,138 B1 | 4/2002 | Ischy et al. |
| 6,387,986 B1 | 5/2002 | Moradi-Araghi et al. |
| 6,390,195 B1 | 5/2002 | Nguyen et al. |
| 6,394,185 B1 | 5/2002 | Constien |
| 6,422,314 B1 | 7/2002 | Todd et al. |
| 6,454,003 B1 | 9/2002 | Chang et al. |
| 6,476,169 B1 | 11/2002 | Eoff et al. |
| 6,476,283 B1 | 11/2002 | Devore et al. |

| | | |
|---|---|---|
| 6,485,947 B1 | 11/2002 | Rajgarhia et al. |
| 6,488,763 B2 | 12/2002 | Brothers et al. |
| 6,494,263 B2 | 12/2002 | Todd |
| 6,497,283 B1 | 12/2002 | Eoff et al. |
| 6,508,305 B1 | 1/2003 | Brannon et al. |
| 6,509,301 B1 | 1/2003 | Vollmer |
| 6,516,885 B1 | 2/2003 | Munday |
| 6,527,051 B1 | 3/2003 | Reddy et al. |
| 6,554,071 B1 | 4/2003 | Reddy et al. |
| 6,569,814 B1 | 5/2003 | Brady et al. |
| 6,569,983 B1 | 5/2003 | Treybig et al. |
| 6,599,863 B1 | 7/2003 | Palmer et al. |
| 6,609,578 B2 | 8/2003 | Patel et al. |
| 6,627,719 B2 | 9/2003 | Whipple et al. |
| 6,667,279 B1 | 12/2003 | Hessert et al. |
| 6,669,771 B2 | 12/2003 | Tokiwa et al. |
| 6,681,856 B1 | 1/2004 | Chatterji et al. |
| 6,686,328 B1 | 2/2004 | Binder |
| 6,702,023 B1 | 3/2004 | Harris et al. |
| 6,710,019 B1 | 3/2004 | Sawdon et al. |
| 6,710,107 B2 | 3/2004 | Audibert et al. |
| 6,761,218 B2 | 7/2004 | Nguyen et al. |
| 6,763,888 B1 | 7/2004 | Harris et al. |
| 6,787,506 B2 | 9/2004 | Blair et al. |
| 6,793,018 B2 | 9/2004 | Dawson et al. |
| 6,803,348 B2 | 10/2004 | Jones et al. |
| 6,817,414 B2 | 11/2004 | Lee |
| 6,855,672 B2 | 2/2005 | Poelker et al. |
| 6,896,058 B2 | 5/2005 | Munoz, Jr. et al. |
| 6,949,491 B2 | 9/2005 | Cooke, Jr. |
| 6,983,801 B2 | 1/2006 | Dawson et al. |
| 6,997,259 B2 | 2/2006 | Nguyen |
| 7,021,377 B2 | 4/2006 | Todd et al. |
| 7,036,586 B2 | 5/2006 | Roddy et al. |
| 7,093,664 B2 | 8/2006 | Todd et al. |
| 7,398,825 B2 | 7/2008 | Nguyen, et al. |
| 2001/0016562 A1 | 8/2001 | Muir et al. |
| 2002/0036088 A1 | 3/2002 | Todd |
| 2002/0125012 A1 | 9/2002 | Dawson et al. |
| 2003/0019627 A1 | 1/2003 | Qu et al. |
| 2003/0060374 A1 | 3/2003 | Cooke, Jr. |
| 2003/0104948 A1 | 6/2003 | Poelker et al. |
| 2003/0114314 A1 | 6/2003 | Ballard et al. |
| 2003/0130133 A1 | 7/2003 | Vollmer |
| 2003/0188766 A1 | 10/2003 | Banerjee et al. |
| 2003/0191030 A1 | 10/2003 | Blair et al. |
| 2003/0234103 A1 | 12/2003 | Lee et al. |
| 2004/0014607 A1 | 1/2004 | Sinclair et al. |
| 2004/0040706 A1 | 3/2004 | Hossaini et al. |
| 2004/0045712 A1 | 3/2004 | Eoff et al. |
| 2004/0055747 A1 | 3/2004 | Lee |
| 2004/0070093 A1 | 4/2004 | Mathiowitz et al. |
| 2004/0094300 A1 | 5/2004 | Sullivan et al. |
| 2004/0102331 A1 | 5/2004 | Chan et al. |
| 2004/0106525 A1 | 6/2004 | Willberg et al. |
| 2004/0138068 A1 | 7/2004 | Rimmer et al. |
| 2004/0152601 A1 | 8/2004 | Still et al. |
| 2004/0152602 A1 | 8/2004 | Boles |
| 2004/0162386 A1 | 8/2004 | Altes et al. |
| 2004/0171495 A1 | 9/2004 | Zamora et al. |
| 2004/0214724 A1 | 10/2004 | Todd et al. |
| 2004/0216876 A1 | 11/2004 | Lee |
| 2004/0220058 A1 | 11/2004 | Eoff et al. |
| 2004/0229756 A1 | 11/2004 | Eoff et al. |
| 2004/0229757 A1 | 11/2004 | Eoff et al. |
| 2004/0231845 A1 | 11/2004 | Cooke, Jr. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2004/0261999 A1 | 12/2004 | Nguyen |
| 2005/0000694 A1 | 1/2005 | Dalrymple et al. |
| 2005/0006095 A1 | 1/2005 | Justus et al. |
| 2005/0028976 A1 | 2/2005 | Nguyen |
| 2005/0034861 A1 | 2/2005 | Saini et al. |
| 2005/0034865 A1 | 2/2005 | Todd et al. |
| 2005/0034868 A1 | 2/2005 | Frost et al. |
| 2005/0045328 A1 | 3/2005 | Frost et al. |
| 2005/0059556 A1 | 3/2005 | Munoz, Jr. et al. |
| 2005/0059557 A1 | 3/2005 | Todd et al. |
| 2005/0059558 A1 | 3/2005 | Blauch et al. |
| 2005/0103496 A1 | 5/2005 | Todd et al. |
| 2005/0126780 A1 | 6/2005 | Todd et al. |
| 2005/0126785 A1 | 6/2005 | Todd |
| 2005/0130848 A1 | 6/2005 | Todd et al. |
| 2005/0155796 A1 | 7/2005 | Eoff et al. |
| 2005/0161220 A1 | 7/2005 | Todd et al. |
| 2005/0164894 A1 | 7/2005 | Eoff et al. |
| 2005/0167104 A1 | 8/2005 | Roddy et al. |
| 2005/0167105 A1 | 8/2005 | Roddy et al. |
| 2005/0178549 A1 | 8/2005 | Eoff et al. |
| 2005/0183741 A1 | 8/2005 | Surjaatmadja et al. |
| 2005/0199396 A1 | 9/2005 | Sierra et al. |
| 2005/0205258 A1 | 9/2005 | Reddy et al. |
| 2005/0205266 A1 | 9/2005 | Todd et al. |
| 2005/0230114 A1 | 10/2005 | Eoff et al. |
| 2005/0230116 A1 | 10/2005 | Eoff et al. |
| 2005/0252659 A1 | 11/2005 | Sullivan et al. |
| 2005/0272613 A1 | 12/2005 | Cooke, Jr. |
| 2005/0274517 A1 | 12/2005 | Blauch et al. |
| 2005/0277554 A1 | 12/2005 | Blauch et al. |
| 2005/0279502 A1 | 12/2005 | Eoff et al. |
| 2005/0284632 A1 | 12/2005 | Dalrymple et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. et al. |
| 2006/0105918 A1 | 5/2006 | Munoz, Jr. et al. |
| 2006/0169182 A1 | 8/2006 | Todd et al. |
| 2006/0169449 A1 | 8/2006 | Mang et al. |
| 2006/0169450 A1 | 8/2006 | Mang et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini et al. |
| 2006/0185848 A1 | 8/2006 | Surjaatmadja et al. |
| 2008/0070807 A1 | 3/2008 | Munoz et al. |
| 2008/0070808 A1 | 3/2008 | Munoz et al. |
| 2008/0139411 A1 | 6/2008 | Harris et al. |
| 2008/0173448 A1 | 7/2008 | Nguyen et al. |
| 2008/0196897 A1 | 8/2008 | Nguyen |

FOREIGN PATENT DOCUMENTS

| | | |
|---|---|---|
| EP | 0 510 762 A2 | 10/1992 |
| EP | 0 383 337 B1 | 4/1996 |
| EP | 0 879 935 A2 | 11/1998 |
| EP | 0 879 935 A3 | 2/1999 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| EP | 1 413 710 A1 | 4/2004 |
| GB | 2 221 940 A | 2/1990 |
| GB | 2 335 428 A | 9/1999 |
| GB | 2 412 389 | 3/2004 |
| WO | WO 93/15164 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 A1 | 6/1999 |
| WO | WO 99/49183 | 9/1999 |
| WO | WO 99/50530 | 10/1999 |

| WO | WO 00/57022 A1 | 9/2000 |
| WO | WO 00/78890 | 12/2000 |
| WO | WO 01/02698 A1 | 1/2001 |
| WO | WO 01/87797 A1 | 11/2001 |
| WO | WO 02/055843 A1 | 1/2002 |
| WO | WO 02/12674 A1 | 2/2002 |
| WO | WO 02/097236 A1 | 12/2002 |
| WO | WO 03/027431 A2 | 4/2003 |
| WO | WO 03/056130 A1 | 7/2003 |
| WO | WO 2004/007905 A1 | 1/2004 |
| WO | WO 2004/037946 A1 | 5/2004 |
| WO | WO 2004/038176 A1 | 5/2004 |
| WO | WO 2004/094781 A1 | 11/2004 |
| WO | WO 2004/101706 A1 | 11/2004 |
| WO | WO 03/027431 A3 | 4/2006 |

OTHER PUBLICATIONS

Eoff, Larry, et al, Structure and Process Optimization for the Use of a Polymeric Relative-Permeability Modifier in Conformance Control, SPE Paper No. 64985, 2001.

Inikori, Solomon Ovueferaye, Numerical Study of Water Coning Control with Downhole Water Sink (DWS) Well Completions in Vertical and Horizontal Wells, Aug. 2002.

Zhou, Z. J., et al, Controlling Formation Damage Using Clay Stabilizers: A Review, Paper 95-71, The Petroleum Society of CIM, 1995.

Halliburton, 2001 Press Releases, Halliburton Technology Uses Revolutionary Polymer System to Control Unwanted Water Production, 2002 Halliburton, pp. 1-2.

Halliburton, 2001 Press Releases, First Halliburton H2ZeroTM Conformance Solution Job Performed for a Producing Well in Egypt, 2002 Halliburton, pp. 1-2.

Halliburton, 2001 Press Releases, Halliburton Performs First H2ZeroTM Conformance Solution Job in North America, 2002 Halliburton, pp. 1-2.

BJ Services Company, Aquacon, Product Information, Aug. 1, 2001, pp. 1-2.

BJ Services Company, Aquatrol I, Product Information, Dec. 14, 2000, pp. 1-2.

Proett, et al., Advanced Dual Probe Formation Tester with Transient, Harmonic, and Pulsed Time-Delay Testing Methods Determines Permeability, Skin, and Anisotropy, SPE 64650.

Proett, et al., Advanced Permeability and Anisotropy Measurements While Testing and Sampling in Real-time Using a Dual Probe Formation Tester, SPE 62919, 2000.

Bai, et al., Improved Determination of Stress-Dependent Permeability for Anisotropic Formations, SPE/ISRM 78188, 2000, Society of Petroleum Engineers Inc.

Parker, et al., Laser Drilling: Effects of Beam Application Methods on Improving Rock Removal, SPE 84353, 2003, Society of Petroleum Engineers Inc.

Xu, et al., Modeling of Laser Spallation Drilling of Rocks for Gas—and Oilwell Drilling, SPE 95746, 2005, Society of Petroleum Engineers Inc.

Batarseh, et al., Well Perforation Using High-Power Lasers, SPE 84418, 2003, Society of Petroleum Engineers Inc.

Gahan, et al., Analysis of Efficient High-Power Fiber Lasers for Well Perforation, SPE 90661, 2004, Society of Petroleum Engineers Inc.

Gahan, et al., Effect of Downhole Pressure Conditions on High-Power Laser Perforation, SPE 97093, 2005, Society of Petroleum Engineers.

Simmons, et al., Poly(phenyllactide): Synthesis, Characterization, and Hydrolytic Degradation, Biomacromolecules, vol. 2, No. 2, 2001 (pp. 658-663).

Yin, et al., Preparation and Characterization of Substituted Polylactides, American Chemical Society, vol. 32, No. 23, 1999 (pp. 7711-7718).

Yin, et al., Synthesis and Properties of Polymers Derived form Substituted Lactic Acids, American Chemical Society, Ch. 12, 2001 (pp. 147-159).

Cantu, et al, Laboratory and Field Evaluation of a Combined Fluid-Loss-Control Additive and Gel Breaker for Fracturing Fluids, SPE 18211, Society of Petroleum Engineers, 1990.

Love, et al, Selectively Placing Many Fractures in Openhole Horizontal Wells Improves Production, SPE 50422, Society of Petroleum Engineers, 1998.

McDaniel, et al, Evolving New Stimulation Process Proves Highly Effective in Level 1 Dual-Lateral Completion, SPE 78697, Society of Petroleum Engineers, 2002.

Albertsson, et al, Aliphatic Polyesters: Systhesis, Properties and Applications, Advances in Polymer Science, vol. 157, Degradable Aliphatic Polyesters, 2002.

Dechy-Cabaret, et al, Controlled Ring-Opening Polymerization of Lactide and Glycolide, American Chemical Society, Chemical Reviews, A-Z, AA-AD, received 2004.

Funkhouser, et al, Synthetic Polymer Fracturing Fluid for High-Temperature Applications, SPE 80236, Society of Petroleum Engineers, 2003.

Chelating Agents, Encyclopedia of Chemical Technology, vol. 5 (764-795).

Vichaibun, et al, A New Assay for the Enzymatic Degradation of Polylactic Acid, Short Report, ScienceAsia, vol. 29, 2003 (pp. 297-300).

Halliburton, SurgiFracSM Service, A Quick and Cost-Effective Method to Help Boost Production From Openhole Horizontal Completions, Halliburton Communications, HO3297, 2002.

Halliburton, Cobra FracSM Service, Coiled Tubing Fracturing—Cost-Effective Method for Stimulating Untapped Reserves, H02319R, Halliburton Energy Services, 2000.

Halliburton, CobraJet FracSM Service, Cost-effective Technology That Can Help Reduce Cost Per BOE Produced, Shorten Cycle Time and Reduce Capex, Halliburton Communications.

Y. Chiang et al., Hydrolysis of Ortho Esters; Further Investigation of the Factors Which Control the Rate-Determining Step, Engineering Information, Inc. NY, NY, vol. 105, No.

M. Ahmad, et al., Ortho Ester Hydrolysis: Direct Evidence for a Three-Stage Reaction Mechanism, Engineering Information, Inc. NY, NY, vol. 101, No. 10 (XP-002322843).

Skrabal et al, The Hydrolysis Rate of Orthoformic Acid Ethyl Ether, Chemical Institute of the University of Graz, Jan. 13, 1921, pp. 1-38.

Heller, et al., Poly(ortho esters)—From Concept To Reality, Biomacromolecules, vol. 5, No. 5, 2004 (pp. 1625-1632).

Schwach-Abdellaoui, et al., Hydrolysis and Erosion Studies of Autocatalyzed Poly(ortho esters) Containing Lactoyl-Lactyl Acid Dimers, American Chemical Society, vol. 32, No. 2.

Ng, et al., Synthesis and Erosion Studies of Self-Catalyzed Poly(ortho ester)s, American Chemical Society, vol. 30, No. 4, 1997 (pp. 770-772).

Ng, et al., Development of a Poly(ortho ester) prototype With a Latent Acid in the Polymer Backbone for 5-fluorouracil Delivery, Journal of Controlled Release 65 (2000), (pp.

Rothen-Weinhold, et al., Release of BSA from poly(ortho ester) extruded thin strands, Journal of Controlled Release 71, 2001, (pp. 31-37).

Heller, et al., Poly(ortho ester)s—their development and some recent applications, European Journal of Pharmaceutics and Biopharmaceutics, 50, 2000, (pp. 121-128).

Heller, et al., Poly(ortho esters); synthesis, characterization, properties and uses, Advanced Drug Delivery Reviews, 54, 2002, (pp. 1015-1039).

Heller, et al., Poly(ortho esters) for the Pulsed and Continuous Delivery of Peptides and Proteins, Controlled Release and Biomedical Polymers Department, SRI International, (.

Zignani, et al., Subconjunctival biocompatibility of a viscous bioerodable poly(ortho ester), J. Biomed Mater Res, 39, 1998, pp. 277-285.

Toncheva, et al., Use of Block Copolymers of Poly(Ortho Esters) and Poly (Ethylene Glycol), Journal of Drug Targeting, 2003, vol. 11(6), pp. 345-353.

Schwach-Abdellaoui, et al., Control of Molecular Weight for Auto-Catalyzed Poly(ortho ester) Obtained by Polycondensation Reaction, International Journal of Polymer Anal. Char.

Heller, et al., Release of Norethindrone from Poly(Ortho Esters), Polymer Engineering and Science, Mid-Aug. 1981, vol. 21, No. 11 (pp. 727-731).

Cordes, et al., Mechanism and Catalysis for Hydrolysis of Acetals, Ketals, and Other Esters, Department of Chemistry, Indiana University, Bloomington, Indiana, Chemical Review.

Mang, Michael et al., "Self-Degrading Fibers and Associated Methods of Use and Manufacture" filed Jan. 31, 2005 as U.S. Appl. No. 11/047,876.

Mang, Michael et al., "Degradable Particulate Generation and Associated Methods" filed Feb. 2, 2005, as U.S. Appl. No. 11/049,600.

Todd, Bradley et al., "Methods of Controlling the Degradation Rate of Hydrolytically Degradable Materials" filed Jun. 7, 2005 as U.S. Appl. No. 11/147,093.

Saini, Rajesh, "Degradable Surfactants and Methods for Use" filed May 12, 2005 as U.S. Appl. No. 11/128,060.

Saini, Rajesh, "Degradable Surfactants and Methods for Use" filed May 12, 2005 as U.S. Appl. No. 11/127,583.

Nguyen, Philip, et al. "Methods for Controlling Water and Sand Production in Subterranean Wells" filed Jul. 15, 2005 as U.S. Appl. No. 11/183,028.

Morrison, Robert et al., Organic Chemistry, Sixth Edition, 1992, pp. 242-243.

Schriener, Kirk et al., "Methods of Degrading Filter Cakes In A Subterranean Formation" filed Aug. 24, 2006 as U.S. Appl. No. 11/509,411.

Munoz, T. et al., "Improved Drill-In Fluids and Associated Methods" filed Sep. 20, 2006 as U.S. Appl. No. 11/524,116.

Munoz, T. et al., "Improved Drill-In Fluids and Associated Methods" filed Sep. 20, 2006 as U.S. Appl. No. 11/523,908.

Office Action for U.S. Appl. No. 11/524,116 dated Oct. 30, 2008.

Office Action mailed Oct. 24, 2008, for U. S. Appl. No. 11/523,908.

Office Action for U.S. Appl. No. 11/524,116, dated Jul. 8, 2009.

Office Action for U.S. Appl. No. 11/523,908, dated Jul. 8, 2009.

FIG. 1

DRILL-IN FLUIDS AND ASSOCIATED METHODS

BACKGROUND OF THE INVENTION

The present invention relates to fluid loss control for drill-in fluids for use in subterranean formations, and more particularly to fluid loss control for drill-in fluids and filter cakes comprising degradable bridging agents, and to methods of using such fluids in subterranean drilling operations.

Many oil and gas wells in unconsolidated or poorly consolidated sandstone formations are completed "open hole," meaning that the well bores do not contain casing or liners. Although this type of completion allows the produced fluids to flow directly into the well bore, it suffers the disadvantage that the sandface is unsupported and may collapse. Also, selective treatments or remedial operations within the reservoir section may be more difficult.

Unconsolidated or poorly consolidated formations generally are high permeability production intervals and are drilled with specialized fluids referred to in the art as "drill-in fluids." A drill-in fluid generally comprises two components: particulate solids (e.g., for bridging on the pore throats of the sandstone of the formation); and polymeric components (e.g., for providing viscosity and fluid loss control). Under pressurized downhole conditions, the drill-in fluid may form a filter cake that comprises an acid-soluble portion (e.g., calcium carbonate bridging solids) and a polymeric portion on the face of a portion of the subterranean formation. In most instances, once formed, the integrity of the filter cake should be maintained to provide the necessary fluid loss control and hole stability for subsequent operations. A common subsequent treatment is a gravel pack sand control operation that involves running a screen into the open hole interval, and pumping a gravel pack fluid comprising gravel into the annulus between the screen and open hole to form a gravel pack.

Generally, at some point after the gravel pack is placed, it is desirable to remove the filter cake from the formation face as it may act as an impediment to the production of desirable fluids from the formation. However, degrading the filter cake may be difficult since the screen and gravel pack tend to prevent the components designed to degrade the filter cake from interacting with it. Degrading the filter cake may be even more difficult, considering that the degradation is generally best when it is uniformly accomplished along what may be thousands of feet of open hole. Thus, because the gravel and gravel pack carrier fluid contact the filter cake uniformly across the entire interval, placing components with the gravel pack that are capable of ultimately degrading the filter cake would be desirable if such degradation could be delayed long enough to ensure that the placement of the gravel pack treatment is not jeopardized or high fluid loss rates are not incurred until the completion equipment is installed.

To degrade the acid-soluble particulate portion of the drill-in fluid filter cake, acids or delayed-release acid systems may be used. A common type of delayed-release acid system comprises acid precursors that slowly hydrolyze to form acids that may ultimately degrade the acid-soluble portion of the filter cake. These delayed-release acid systems, however, can be problematic if they degrade the acid-soluble component of the filter cake too slowly or too quickly. Removal of only 1% to 2% of the bridging solids in the filter cake can result in a significant loss of fluid to the surrounding formation. If a delayed-release acid system is designed not to dissolve more than 1% or 2% of the acid-soluble portion of the filter cake in a chosen period of time (e.g., a 12-hour period), then total removal may take days, if not weeks. This is undesirable. On the other hand, if a delayed-release acid system is designed to totally degrade the acid-soluble portion within an acceptable "total cleanup time" (e.g., 24 to 48 hours), it is likely to cause hole instability and potential fluid loss problems during gravel pack placement. To control such fast-acting delayed-release acid systems, buffers (which are mixtures of weak acids and their conjugate bases) may be considered to achieve a delayed interaction of the acid with the acid-soluble portion of the filter cake for a desired time period. However, such buffer systems have met with little success when used with these delayed-release acid systems, inter alia, because the esters may undergo acid- or base-catalyzed hydrolysis at pHs much below or above 7. Also, conventional buffers may suffer when exposed to components, such as calcium carbonate, in the filter cake and, as a result, the acid component of the buffer may be quickly consumed.

Oxidizers have been used to degrade the polymeric portions of filter cakes within desired delay and total cleanup times. Since these oxidizers are not able to degrade the acid-soluble portion of a filter cake, the usefulness of such oxidizer systems generally is limited to cases where the bridging particles that comprise the particulate portion of the filter cake are small enough to flow back through the screen.

High permeability sandstone can be problematic for drill-in fluids because of fluid loss into the formation. Fluid loss is undesirable as it results in more fluid needing to be pumped, which increases expense. Moreover, the fluid that leaks off into the formation can cause damage to the formation, which may decrease permeability and/or productivity.

SUMMARY OF THE INVENTION

The present invention relates to fluid loss control for drill-in fluids for use in subterranean formations, and more particularly to fluid loss control for drill-in fluids and filter cakes comprising degradable bridging agents, and to methods of using such fluids in subterranean drilling operations.

In one embodiment, the present invention provides a drill-in fluid comprising an aqueous base fluid, a viscosifier, a relative permeability modifier fluid loss control additive, and a degradable bridging agent comprising a degradable material capable of undergoing an irreversible degradation downhole.

In one embodiment, the present invention provides a drill-in fluid comprising: an aqueous base fluid; a viscosifier; a relative permeability modifier fluid loss control additive; and a degradable bridging agent that comprises a degradable material chosen from the group consisting of: a degradable polymer, a dehydrated compound, or blend thereof.

The features and advantages of the present invention will be readily apparent to those skilled in the art upon a reading of the description of the preferred embodiments, which follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to fluid loss control for drill-in fluids for use in subterranean formations, and more particularly to fluid loss control for drill-in fluids and filter cakes comprising degradable bridging agents, and to methods of using such fluids in subterranean drilling operations.

The drill-in fluids of the present invention generally comprise an aqueous base fluid, a viscosifier, a relative permeability modifier fluid loss control additive, and a degradable bridging agent comprising a degradable material capable of undergoing an irreversible degradation downhole. Optionally, the drill-in fluids can comprise any additional additives suitable for use in such fluids. The term "irreversible" as used herein means that the degradable material once degraded should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

The drill-in fluids of the present invention comprise an aqueous base fluid. The aqueous-base fluid component of the fluids of the present invention may include fresh water, saltwater, brine (e.g., saturated saltwater), or seawater. Generally, the water may be from any source provided that it does not contain components that may adversely affect other components in the fluid.

The drill-in fluids of the present invention comprise a viscosifier. A variety of viscosifiers may be included in the drill-in fluids of the present invention. Examples of suitable viscosifiers include, inter alia, biopolymers such as xanthan and succinoglycan, cellulose derivatives such as hydroxyethylcellulose, and guar and its derivatives such as hydroxypropyl guar. Combinations and derivatives of these are suitable as well. In certain preferred embodiments, the viscosifier is xanthan. The viscosifier is present in the drill-in fluids of the present invention in an amount sufficient to suspend the bridging agent and drill cuttings in the drill-in fluid. More particularly, the viscosifier may be present in the drill-in fluids of the present invention in an amount in the range of from about 0.01% to about 1% by weight. In certain preferred embodiments, the viscosifier is present in the drill-in fluid in an amount in the range of from about 0.13% to about 0.30% by weight.

The drill-in fluids of the present invention further comprise a relative permeability modifier fluid loss control additive, also referred to herein as a "relative permeability modifier." Generally, the relative permeability modifiers useful in the present invention may be any relative permeability modifier that is suitable for use in subterranean operations. After introducing the relative permeability modifier into a portion of the subterranean formation, e.g., with a drill-in fluid of the present invention, it is believed that the relative permeability modifier attaches to surfaces within the porosity of the subterranean formation, so as to reduce the permeability of the portion of the subterranean formation to aqueous fluids without substantially changing its permeability to hydrocarbons. Additionally, in some embodiments, the relative permeability modifier may also facilitate suspension of the bridging agents in the drill-in fluids.

Examples of suitable relative permeability modifiers include water-soluble polymers, with or without hydrophobic or hydrophilic modification. A water-soluble polymer with hydrophobic modification is referred to herein as a "hydrophobically modified polymer." As used herein, the term "hydrophobic modification," or "hydrophobically modified," refers to the incorporation into the hydrophilic polymer structure of hydrophobic groups, wherein the alkyl chain length is from about 4 to about 22 carbons. A water-soluble polymer with hydrophilic modification is referred to herein as a "hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer. Combinations of hydrophobically modified polymers, hydrophilically modified polymers, and water-soluble polymers without hydrophobic or hydrophilic modification may be included in the relative modifier fluids of the present invention.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized using any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming hydrophobically modified polymers of the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). Combinations and derivatives of these are suitable as well. In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine. Combinations and derivatives of these are suitable as well.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. Combinations and derivatives of these are suitable as well. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyl-diallyl ammonium halide, itaconic acid, styrene sulfonic acid, methacrylamidoethyltrimethyl ammonium halide, quaternary salt derivatives of acrylamide, and quaternary salt derivatives of acrylic acid. Combinations and derivatives of these are suitable as well.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. Combinations and derivatives of these are suitable as well. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide. Combinations and derivatives of these are suitable as well.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Combinations and derivatives of these are suitable as well. Another suitable hydrophobically modified polymer formed from the above-described reaction is an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may be a dimethylaminoethyl methacrylate/hexadecyl-dimethylammoniumethyl methacrylate bromide copolymer. Combinations and derivatives of these are suitable as well.

In another embodiment of the present invention, the relative permeability modifier may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). Combinations and derivatives of these are suitable as well. In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. Combinations and derivatives of these are suitable as well. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Combinations and derivatives of these are suitable as well. Examples of suitable polyethers include, but are not limited to, polyethylene oxides, polypropylene oxides, and polybutylene oxides, and copolymers, terpolymers, and mixtures thereof. Combinations and derivatives of these are suitable as well. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. Combinations and derivatives of these are suitable as well. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of a suitable relative permeability modifier should be present in the fluids of the present invention to provide the desired degree of fluid loss control, gravel suspension, and/or viscosity enhancement. In some embodiments, the relative permeability modifier should be included in the fluids of the present invention in an amount in the range of from about 0.02% to about 10% by weight of the fluid. In other embodiments, the relative permeability modifier should be present in the fluids of the present invention in an amount in the range of from about 0.01% to about 1.0% by weight of the fluid. In certain embodiments, the relative permeability modifier may be provided in a concentrated aqueous solution prior to its combination with the other components necessary to form the fluids of the present invention.

In other embodiments of the present invention, the relative permeability modifiers may comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid. Combinations and derivatives of these are suitable as well.

The drill-in fluids of the present invention further comprise a degradable bridging agent. The bridging agent becomes suspended in the drill-in fluid and, as the drill-in fluid begins to form a filter cake within the subterranean formation, the bridging agent becomes distributed in the resulting filter cake, most preferably uniformly. In certain preferred embodiments, the filter cake forms upon the face of the formation itself, upon a sand screen, upon a gravel pack, or upon another suitable surface within the subterranean formation or well bore. After the requisite time period dictated by the characteristics of the particular degradable bridging agent used, the degradable bridging agent degrades. This degradation, in effect, causes the degradable bridging agent to be removed from the filter cake, preferably substantially. As a result, voids are created in the filter cake. Removal of the degradable bridging agent from the filter cake should allow produced fluids to flow more freely.

Generally, the degradable bridging agent is present in the drill-in fluid in an amount sufficient to create an efficient filter cake. As referred to herein, the term "efficient filter cake" will be understood to mean a filter cake comprising no material beyond that required to provide a desired level of fluid loss control. In certain embodiments, the degradable bridging agents are present in the drill-in fluid in an amount ranging from about 0.1% to about 32% by weight. In certain preferred embodiments, the degradable bridging agents are present in the drill-in fluid in the range of from about 3% and about 10% by weight. In certain preferred embodiments, the bridging agent is present in the drill-in fluids in an amount sufficient to provide a fluid loss of less than about 15 mL in tests conducted according to the procedures set forth by API Recommended Practice (RP) 13. One of ordinary skill in the art with the benefit of this disclosure will recognize an optimum concentration of degradable material that provides desirable values in terms of enhanced ease of removal of the filter cake at the desired time without undermining the stability of the filter cake during its period of intended use.

The degradable bridging agents comprise a degradable material. Nonlimiting examples of suitable degradable materials that may be used in conjunction with the present invention include, but are not limited to, degradable polymers, dehydrated compounds, and/or mixtures of the two. Combinations and derivatives of these are suitable as well. In choosing the appropriate degradable material, one should consider the degradation products that will result. Also, these degradation products should not adversely affect other operations or components. For example, a boric acid derivative may not be included as a degradable material in the drill-in fluids of the present invention where such fluids utilize xanthan as the viscosifier, because boric acid and xanthan are generally incompatible. One of ordinary skill in the art, with the benefit of this disclosure, will be able to recognize when potential components of the drill-in fluids of the present invention would be incompatible or would produce degradation products that would adversely affect other operations or components.

As for degradable polymers, a polymer is considered to be "degradable" herein if the degradation is due to, inter alia, chemical and/or radical process such as hydrolysis, oxidation, enzymatic degradation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A. C. Albertsson, the disclosure of which is hereby incorporated by reference. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextrans or celluloses; chitins; chitosans; proteins; orthoesters; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Combinations and derivatives of these are suitable as well. Of these suitable polymers, aliphatic polyesters and polyanhydrides are preferred. Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

Plasticizers may be present in the degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. Preferably q is an integer; $2 \leq q \leq 10$. As used herein the term "derivatives of oligomeric lactic acid" includes derivatives of oligomeric lactide.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference. In addition to the other qualities above, the plasticizers may enhance the degradation rate of the degradable polymeric materials.

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by changing the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Dehydrated compounds may be used in accordance with the present invention as a degradable material. A dehydrated compound is suitable for use in the present invention if it will degrade over time as it is rehydrated. For example, a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. Combinations and derivatives of these are suitable as well. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly (lactic acid) and boric oxide, a blend of calcium carbonate and poly(lactic) acid, a blend of magnesium oxide and poly(lactic) acid, and the like. In certain preferred embodiments, the degradable material is calcium carbonate plus poly(lactic) acid. Where a mixture including poly(lactic) acid is used, in certain preferred embodiments the poly(lactic) acid is present in the mixture in a stoichiometric amount, e.g., where a mixture of calcium carbonate and poly(lactic) acid is used, the mixture comprises two poly(lactic) acid units for each calcium carbonate unit. Other blends that undergo an irreversible degradation may also be suitable, if the products of the degradation do not undesirably interfere with either the conductivity of the filter cake or with the production of any of the fluids from the subterranean formation.

The choice of degradable material can depend, at least in part, on the conditions of the well, e.g., well bore temperature. For instance, lactides have been found to be suitable for lower temperature wells, including those within the range of about 60° F. to about 150° F., and polylactides have been found to be suitable for well bore temperatures above this range. Dehydrated salts may also be suitable for higher temperature wells.

Also, we have found that a preferable result is achieved if the degradable material degrades slowly over time as opposed to instantaneously. The slow degradation of the degradable material helps, inter alia, to maintain the stability of the filter cake.

The specific features of the degradable material may be modified so as to maintain the filter cake's filtering capability when the filter cake is intact while easing the removal of the filter cake when such removal becomes desirable. In certain embodiments, the degradable material has a particle size distribution in the range of from about 0.1 micron to about 1.0 millimeters. Whichever degradable material is utilized, the bridging agents may have any shape, including but not limited to particles having the physical shape of platelets, shavings, flakes, ribbons, rods, strips, spheroids, toroids, pellets, tablets, or any other physical shape. One of ordinary skill in the art with the benefit of this disclosure will recognize the specific degradable material and the preferred size and shape for a given application.

The fluids of the present invention optionally may comprise gravel particulates suitable for use in subterranean applications. Suitable gravel particulates include, but are not limited to, gravel, natural sand, quartz sand, particulate garnet, glass, ground walnut hulls, nylon pellets, aluminum pellets, bauxite, ceramics, and polymeric materials, and combinations thereof. One having ordinary skill in the art, with the benefit of this disclosure, will recognize the particulate type, size, and amount to use in conjunction with the fluids of the present invention to achieve a desired result. In certain embodiments, the gravel particulates used may be included in the fluids to form a gravel pack downhole. In some embodiments, the gravel particulates may be coated with a resin or tackifying composition, wherein the gravel particulates may form hard, permeable masses in the formation, inter alia, to reduce the migration of formation particulates.

Additional additives may be added to the fluids of the present invention as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, additional fluid loss control additives, gel breakers, shale swelling inhibitors, and combinations thereof.

The fluids of the present invention may be used in a variety of sand control operations where it is desirable to provide fluid loss control, gravel particulate suspension, and/or viscosity enhancement. In some embodiments, where the fluids of the present invention are used with gravel packing and frac packing operations, carrier fluids that comprise an aqueous component, a water-soluble relative permeability modifier, and gravel particulates may be introduced into a well bore so as to create a gravel pack. In certain embodiments, the carrier fluids of the present invention further may comprise a viscosifying agent. Examples of suitable viscosifying agents include, but are not limited to, xanthan, guar or guar derivatives, cellulose derivatives, a viscoelastic surfactant, etc. In other embodiments, no viscosifying agents may be included in the carrier fluids of the present invention and the relative permeability modifier may act to suspend the gravel particulates. In these embodiments, where no viscosifying agent is included in the carrier fluid, the pumping rates of the carrier fluid should be sufficient to place the gravel particulates into the desired location for the gravel pack without the use of viscosifying agents. In one embodiment, the carrier fluid does not comprise a viscosifying agent where the well bore is horizontal. Among other things, the water-soluble relative permeability modifiers present in the carrier fluid may act to provide gravel particulate suspension and/or reduce fluid loss from the carrier fluid into the subterranean formation. Furthermore, the water-soluble relative permeability modifiers may attach to the gravel particulates placed into the well bore, and to surfaces within the subterranean formation during normal leak off from the carrier fluid. In some embodiments, the presence of the water-soluble relative permeability modifiers on the gravel particulates and in the formation may reduce the permeability of those areas to aqueous-based fluids without substantially changing the permeability to hydrocarbons. This may reduce fluid loss into the formation from other fluids (e.g., completion fluids) that may be introduced into the well bore subsequent to the carrier fluid and reduce the subsequent problems associated with water flowing into the well bore from the subterranean formation.

In other embodiments, the fluids of the present invention may be placed into the well bore as a pill either prior to or after the stabilization of unconsolidated formation particulates in a section of the subterranean formation penetrated by the well bore. The formation particulates may be stabilized by any suitable technique, including gravel packing and frac packing. In these embodiments, fluids of the present invention that comprise an aqueous-based component and a relative permeability modifier may be introduced to the well bore that penetrates the section of the subterranean formation to be stabilized. The desired volume of the fluid of the present invention introduced into the well bore is based, inter alia, on several properties of the section to be treated, such as depth and volume of the section, as well as permeability and other physical properties of material in the section. Among other things, the relative permeability modifier included in the fluid of the present invention may attach to surfaces within the subterranean formation during normal leak off from the carrier fluid or to gravel particulates that may have been placed into the well bore. The presence of the water-soluble relative permeability modifiers on the gravel particulates and/or in the formation may reduce the permeability of those areas to aqueous-based fluids without substantially changing the permeability to hydrocarbons. This may reduce fluid loss into the formation from other fluids (e.g., carrier fluids or completion fluids) that may be introduced into the well bore subsequent to the fluid and reduce the subsequent problems associated with water flowing into the well bore from the subterranean formation.

The filter cake formed by the drill-in fluids of the present invention may be removed after a desired amount of time by being contacted with a degrading agent. In certain embodiments, the degrading agent comprises water. The source of the degrading agent may be, inter alia, a drill-in fluid, such as a gravel pack fluid or a completion brine, for instance. In certain embodiments, the source of the degrading agent may be the bridging agent itself. For example, the bridging agent may comprise a water-containing compound. Any compound containing releasable water may be used as the water-containing compound. As referred to herein, the term "releasable water" will be understood to mean water that may be released under desired downhole conditions, including, inter alia, temperature. In certain embodiments, the water-containing compound may be sodium acetate trihydrate, sodium borate decahydrate, sodium carbonate decahydrate, or the like. In certain preferred embodiments, the water-containing compound is sodium acetate trihydrate.

The filter cake formed by the drill-in fluids of the present invention is a "self-degrading" filter cake. As referred to herein, the term "self-degrading filter cake" will be understood to mean a filter cake that may be removed without the need to circulate a separate "clean up" solution or "breaker" through the well bore, such clean up solution or breaker having no purpose other than to degrade the filter cake. Though the filter cakes formed by the drill-in fluids of the present invention constitute "self-degrading" filter cakes, an operator may nevertheless occasionally elect to circulate a separate clean up solution through the well bore under certain circumstances, such as when the operator desires to hasten the rate of degradation of the filter cake. In certain embodiments, the bridging agents of the present invention are sufficiently acid-degradable as to be removed by such treatment.

An example of a method of the present invention comprises: placing a drill-in fluid in a subterranean formation, the drill-in fluid comprising an aqueous base fluid, a viscosifier, a relative permeability modifier fluid loss control additive, and a degradable bridging agent comprising a degradable material capable of undergoing an irreversible degradation downhole; and forming a self-degrading filter cake comprising the bridging agent upon a surface within the formation whereby fluid loss through the self-degrading filter cake is reduced.

Another example of a method of the present invention is a method comprising: providing a drill-in fluid that comprises an aqueous base fluid, a viscosifier, a relative permeability modifier fluid loss control additive, and a degradable bridging agent comprising a degradable material capable of undergoing an irreversible degradation downhole; placing the drill-in fluid in a subterranean formation; and allowing the relative permeability modifier fluid loss control additive to reduce fluid loss from the drill-in fluid to the subterranean formation.

Another example of a method of the present invention comprises a method of drilling an open hole in a subterranean formation, comprising the steps of: circulating through a drill pipe and drill bit a drill-in fluid comprising an aqueous base fluid, a viscosifier, a relative permeability modifier fluid loss control additive, and a degradable bridging agent comprising a degradable material capable of undergoing an irreversible degradation downhole; forming a filter cake comprising the bridging agent upon a surface within the formation; and permitting the filter cake to degrade.

Another example of a method of the present invention is a method of degrading a filter cake in a subterranean formation comprising: providing a filter cake produced by a drill-in fluid that comprises an aqueous base fluid, a viscosifier, a relative permeability modifier fluid loss control additive, and a degradable bridging agent comprising a degradable material capable of undergoing an irreversible degradation downhole; and allowing the degradable bridging agent to degrade.

An example of a drill-in fluid of the present invention comprises an aqueous base fluid, a viscosifier, a relative permeability modifier fluid loss control additive, and a degradable bridging agent comprising a degradable material capable of undergoing an irreversible degradation downhole.

To facilitate a better understanding of the present invention, the following examples of certain aspects of some embodiments are given. In no way should the following examples be read to limit, or define, the entire scope of the invention. To facilitate a better understanding of the present invention, the following examples of exemplary embodiments are given. In no way should such examples be read to limit the scope of the invention.

EXAMPLES

The drill-in fluids were made using a standard mud mixing and conditioning procedures. Tables 1 and list the components for each sample. "N-Vis" is a xanthan, and is available from Halliburton Energy Services, Duncan, Okla. "N-Dril HT Plus" is a starch, and is available from Halliburton Energy Services, Duncan, Okla. "Baracarb-50" is a calcium carbonate based bridging agent, and is available from Halliburton Energy Services, Duncan, Okla. "Baracarb-5" is a calcium carbonate bridging agent bridging agent, and is available from Halliburton Energy Services, Duncan, Okla. "HIPT-1" is a relative permeability modifier fluid loss control additive, and is available from Halliburton Energy Services, Duncan, Okla. The water, salt, xanthan, and starch were mixed on a Hamilton-Beach blender at high speed for 20 minutes. The remaining ingredients were added at low speed and mixed for an additional five minutes. The mud samples were placed in sealed jars, and then in a 65° C. roller oven for approximately 16 hours.

The drill—in fluid mud recipe without HPT-1 is shown in Table 1.

TABLE 1

| Component | Amount |
|---|---|
| 10% NaCl | 336 mL |
| N-Vis | 0.85 g |

TABLE 1-continued

| Component | Amount |
| --- | --- |
| N Dril HT Plus | 7.4 g |
| PLA Powder (6250D, 160 um) | 28 g |
| Baracarb-50 | 14 g |
| Baracarb-5 | 10 g |

The drill—in fluid mud recipe with HPT-1 is shown in Table 2.

TABLE 2

| Component | Amount |
| --- | --- |
| 10% NaCl | 325 mL |
| N-Vis | 0.85 g |
| N Dril HT Plus | 7.4 g |
| PLA Powder (6250D, 160 um) | 28 g |
| Baracarb-50 | 14 g |
| Baracarb-5 | 10 g |
| HPT-1 | 11 mL |

Figure 1:
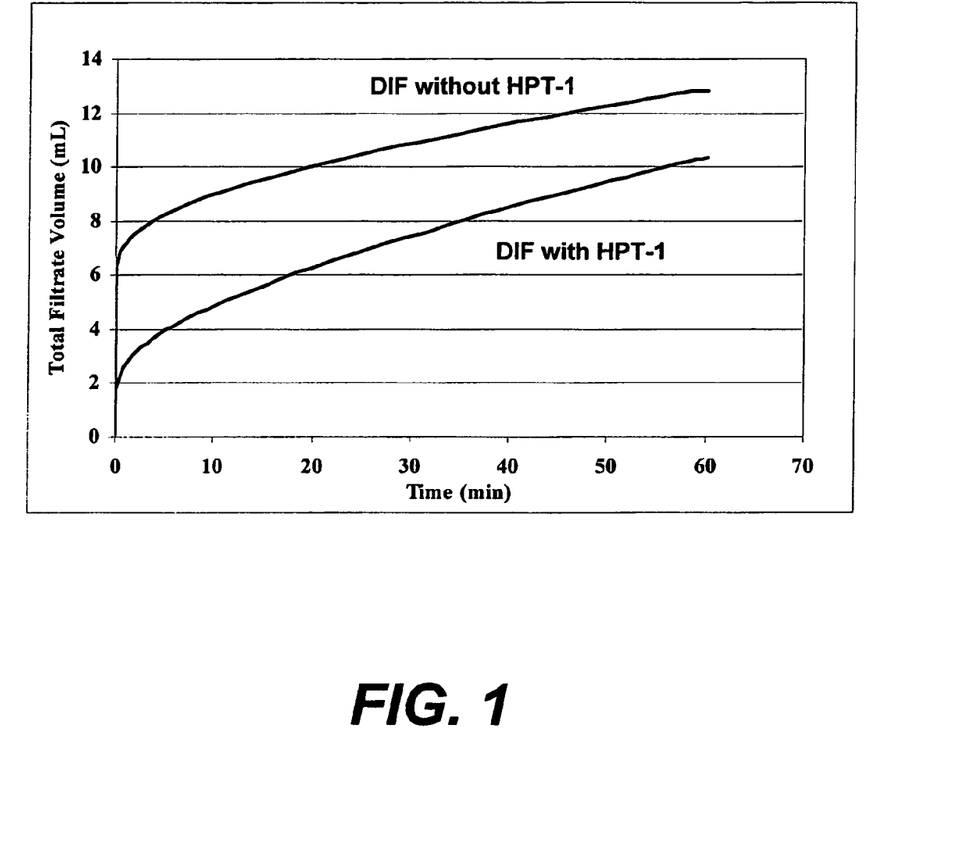
FIG. 1 depicts a graphical representation of the results of experiments discussed in the Examples section.

A standard Model 90B filtration test was performed on the samples at BHST and 500 PSI differential pressure (800 PSI system pressure). Once the system was up to temperature and pressure, the filtrate valve was opened for 60 minutes. The filtrate profile was monitored and analysis was performed on the data. Once the filter cakes were made, the excess mud was poured out of the Model 90B, breaker was added and shut in with the filter cake at temperature. The machine was then programmed to hold a 50 PSI differential pressure on the filter cake at 195° F., and fluid leak off was monitored. We viewed an increase in the fluid leak off rate as an indication of filter cake degradation. FIG. 1 shows the difference in fluid leak off between the samples, with and without HPT-1 added to the drill-in fluid. During the "filter cake making" step, as the bridging particles and polymers form a filter cake there is a "spurt" volume (initial volume measure as the vertical value at 0 minutes), then a filter cake deposition period (the curved part of the chart, from zero to about 20-30 minutes) then the period of cake equilibrium (30+ minutes, straight line part of chart) where the depositional forces equal the erosion forces from the shear shaft. The slope of the straight line portion of the graph is an indication of filter cake thickness and permeability.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the paten-tee. Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

We claim:

1. A drill-in fluid comprising:
   an aqueous base fluid,
   a viscosifier,
   a relative permeability modifier fluid loss control additive, wherein the relative permeability modifier fluid loss control additive comprises a water-soluble hydrophobically modified polymer comprising a reaction product of a hydrophilic polymer and a hydrophobic compound, wherein the mole ratio of the hydrophilic polymer to the hydrophobic compound is in the range of from about 99.98:0.02 to about 90:10, and
   a degradable bridging agent comprising a degradable material capable of undergoing an irreversible degradation downhole.

2. The fluid of claim 1 wherein the hydrophobically modified polymer comprises a polymer backbone, the polymer backbone comprising polar heteroatoms.

3. The fluid of claim 1 wherein the hydrophilic polymer is selected from the group consisting of: polyacrylamide homopolymers; polyacrylamide copolymers; polyacrylamide terpolymers; polyacrylamides; polyvinylamines; poly (vinylamines/vinyl alcohols); alkyl acrylate polymers; polydimethylaminoethyl methacrylate; polydimethylaminopropyl methacrylamide; poly(acrylamide/dimethylaminoethyl methacrylate); poly(methacrylic acid/dimethylaminoethyl methacrylate); poly(2 -acrylamido-2 -methyl propane sulfonic acid/dimethylaminoethyl methacrylate); poly(acrylamide/dimethylaminopropyl methacrylamide); poly (acrylic acid/dimethylaminopropyl methacrylamide); poly(methacrylic acid/dimethylaminopropyl methacrylamide); celluloses; chitosans; polyamides; polyetheramines; polyethyleneimines; polyhydroxyetheramines; polylysines; polysulfones; gums; starches; cationic starches; and combinations and derivatives thereof.

4. The fluid of claim 1 wherein the hydrophobic compound is selected from the group consisting of: alkyl halides; sulfonates; sulfates; organic acids; organic acid derivatives; octenyl succinic acid; dodecenyl succinic acid; anhydrides; esters; imides; amides of octenyl succinic acid; amides of dodecenyl succinic acid; and combinations and derivatives thereof.

5. The fluid of claim 1 wherein the hydrophilic polymer is made from a reaction comprising a hydrophilic monomer selected from the group consisting of: acrylamide; 2 -acrylamido-2 -methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; vinyl sulfonic acid; vinyl phosphonic acid; methacrylic acid; vinyl caprolactam; N-vinylformamide; N,N-diallylacetamide; dimethyldiallyl ammonium halide; itaconic acid; styrene sulfonic acid; methacrylamidoethyltrimethyl ammonium halide; quaternary salt derivatives of acrylamide; quaternary salt derivatives of acrylic acid; and combinations and derivatives thereof.

6. The fluid of claim 1 wherein the hydrophilic polymer is made from a reaction comprising a hydrophobically modified hydrophilic monomer selected from the group consisting of: alkyl acrylates; alkyl methacrylates; alkyl acrylamides; alkyl methacrylamides alkyl dimethylammoniumethyl methacrylate halides; alkyl dimethylammoniumpropyl methacrylamide halides, wherein the alkyl groups have from about 4 to about 22 carbon atoms; octadecyldimethylammoniumethyl methacrylate bromide; hexadecyldimethylammoniumethyl methacrylate bromide; hexadecyldimethylammoniumpropyl methacrylamide bromide; 2-ethylhexyl methacrylate; hexadecyl methacrylamide; and combinations and derivatives thereof.

7. The fluid of claim 1 wherein the hydrophobically modified polymer is selected from the group consisting of: acrylamide/octadecyldimethylammoniumethyl methacrylate bromide copolymers; dimethylaminoethyl methacrylate/vinyl pyrrolidonelhexadecyldimethylammoniumethyl methacrylate bromide terpolymers; and acrylamide/2-acrylamido-2-methyl propane sulfonic acid/2-ethylhexyl methacrylate terpolymers; amino methacrylate/alkyl amino methacrylate copolymers; dimethylaminoethyl methacrylatelhexadecyl-dimethylammoniumethyl methacrylate copolymers; and dimethylaminoethyl methacrylatelhexadecyl-dimethylammoniumethyl methacrylate bromide copolymers.

8. The fluid of claim 1 wherein the degradable material is selected from the group consisting of: degradable polymers, dehydrated compounds, and a blend thereof.

9. The fluid of claim 1 wherein the degradable material is a degradable polymer selected from the group consisting of: aliphatic polyesters; polysaccharides; dextrans; celluloses; chitins; chitosans; proteins; orthoesters; aliphatic polyesters; poly(lactides); poly(glycolides); poly(ecaprolactones); poly(hydroxybutyrates); poly(anhydrides); aliphatic polycarbonates; poly(orthoesters); poly(amino acids); poly(ethylene oxides); polyphosphazenes; poly(adipic anhydride); poly(suberic anhydride); poly(sebacic anhydride); poly(dodecanedioic anhydride); poly(maleic anhydride); poly(benzoic anhydride); and combinations and derivatives thereof.

10. The fluid of claim 1 wherein the degradable material is a dehydrated compound selected from the group consisting of: anhydrous compounds that degrade over time as they are rehydrated; anhydrous sodium tetraborate; and anhydrous boric acid.

11. The fluid of claim 1 further comprising an additive selected from the group consisting of: gravel particulates; natural sand; quartz sand; particulate garnet; glass; ground walnut hulls; nylon pellets; aluminum pellets; bauxite; ceramics; polymeric materials; weighting agents, surfactants, scale inhibitors, antifoaming agents, bactericides, salts, foaming agents, additional fluid loss control additives, gel breakers, shale swelling inhibitors, and combinations thereof.

12. A drill-in fluid comprising:
an aqueous base fluid,
a viscosifier,
a relative permeability modifier fluid loss control additive, wherein the relative permeability modifier fluid loss control additive comprises a water-soluble hydrophobically modified polymer comprising a polymerization reaction product of a hydrophilic monomer and a hydrophobically modified hydrophilic monomer, wherein the mole ratio of the hydrophilic monomer to the hydrophobically modified hydrophilic monomer is in the range of from about 99.98:0.02 to about 90:10; and
a degradable bridging agent comprising a degradable material capable of undergoing an irreversible degradation downhole.

13. The fluid of claim 12 wherein the hydrophobically modified polymer comprises a polymer backbone, the polymer backbone comprising polar heteroatoms.

14. The fluid of claim 12 wherein the hydrophilic monomer is selected from the group consisting of: acrylamide; 2-acrylamido-2-methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; vinyl sulfonic acid; vinyl phosphonic acid; methacrylic acid; vinyl caprolactam; N-vinylformamide; N,N-diallylacetamide; dimethyldiallyl ammonium halide; itaconic acid; styrene sulfonic acid; methacrylamidoethyltrimethyl ammonium halide; quaternary salt derivatives of acrylamide; quaternary salt derivatives of acrylic acid; and combinations and derivatives thereof.

15. The fluid of claim 12 wherein the hydrophobically modified hydrophilic monomer is selected from the group consisting of: alkyl acrylates; alkyl methacrylates; alkyl acrylamides; alkyl methacrylamides alkyl dimethylammoniumethyl methacrylate halides; alkyl dimethylammoniumpropyl methacrylamide halides, wherein the alkyl groups have from about 4 to about 22 carbon atoms; octadecyldimethylammoniumethyl methacrylate bromide; hexadecyldimethylaramoniumethyl methacrylate bromide; hexadecyldimethylammoniumpropyl methacrylamide bromide; 2-ethylhexyl methacrylate; hexadecyl methacrylamide; and combinations and derivatives thereof.

16. The fluid of claim 12 wherein the hydrophobically modified polymer is selected from the group consisting of: acrylamide/octadecyldimethylammoniumethyl methacrylate bromide copolymers; dimethylaminoethyl methacrylate/vinyl pyrrolidonelhexadecyldimethylammoniumethyl methacrylate bromide terpolymers; and acrylamide/2-acrylamido-2-methyl propane sulfonic acid/2-ethylhexyl methacrylate terpolymers; amino methacrylate/alkyl amino methacrylate copolymers; dimethylaminoethyl methacrylatelhexadecyl-dimethylammoniumethyl methacrylate copolymers; and dimethylaminoethyl methacrylatelhexadecyl-dimethylammoniumethyl methacrylate bromide copolymers.

17. The fluid of claim 12 wherein the degradable material is selected from the group consisting of: degradable polymers, dehydrated compounds, and a blend thereof.

18. The fluid of claim 12 wherein the degradable material is a degradable polymer selected from the group consisting of: aliphatic polyesters; polysaccharides; dextrans; celluloses; chitins; chitosans; proteins; orthoesters; aliphatic polyesters; poly(lactides); poly(glycolides); poly(ecaprolactones); poly.(hydroxybutyrates); poly(anhydrides); aliphatic polycarbonates; poly(orthoesters); poly(amino acids); poly(ethylene oxides); polyphosphazenes; poly(adipic anhydride); poly(suberic anhydride); poly(sebacic anhydride); poly(dodecanedioic anhydride); poly(maleic anhydride); poly(benzoic anhydride); and combinations and derivatives thereof.

19. The fluid of claim 12 wherein the degradable material is a dehydrated compound selected from the group consisting of: anhydrous compounds that degrade over time as they are rehydrated; anhydrous sodium tetraborate; and anhydrous boric acid.

20. The fluid of claim 12 further comprising an additive selected from the group consisting of: gravel particulates; natural sand; quartz sand; particulate garnet; glass; ground walnut hulls; nylon pellets; aluminum pellets; bauxite; ceramics; polymeric materials; weighting agents, surfactants, scale inhibitors, antifoaming agents, bactericides, salts, foaming agents, additional fluid loss control additives, gel breakers, shale swelling inhibitors, and combinations thereof.

21. A drill-in fluid comprising:
an aqueous base fluid;
a viscosifier;
a degradable bridging agent that comprises a degradable material selected from the group consisting of: a degradable polymer, a dehydrated compound, and a blend thereof; and
a relative permeability modifier fluid loss control additive selected from the group consisting of:
   a water-soluble hydrophobically modified polymer comprising a reaction product of a hydrophilic polymer and a hydrophobic compound, wherein the mole ratio of the hydrophilic polymer to the hydrophobic compound is in the range of from about 99.98:0.02 to about 90:10, and
   a water-soluble hydrophobically modified polymer comprising a polymerization reaction product of a hydrophilic monomer and a hydrophobically modified hydrophilic monomer, wherein the mole ratio of the hydrophilic monomer to the hydrophobically modified hydrophilic monomer is in the range of from about 99.98:0.02 to about 90:10.

* * * * *